United States Patent
Gal et al.

(10) Patent No.: US 8,168,149 B2
(45) Date of Patent: May 1, 2012

(54) PROMOTER ENHANCED CHILLED AMMONIA BASED SYSTEM AND METHOD FOR REMOVAL OF $CO_2$ FROM FLUE GAS STREAM

(75) Inventors: Eli Gal, Cupertino, CA (US); Otto Morten Bade, Stabekk (NO); Indira Jayaweera, Freemont, CA (US); Gopala Krishnan, Sunnyvale, CA (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 12/958,816

(22) Filed: Dec. 2, 2010

(65) Prior Publication Data

US 2011/0070136 A1 Mar. 24, 2011

Related U.S. Application Data

(63) Continuation of application No. 12/272,953, filed on Nov. 18, 2008, now Pat. No. 7,862,788.

(60) Provisional application No. 60/992,340, filed on Dec. 5, 2007.

(51) Int. Cl.
*B01D 53/14* (2006.01)
(52) U.S. Cl. ............. 423/228; 423/229; 95/183; 95/236
(58) Field of Classification Search ............... 95/183, 95/236; 423/220, 226–229, 242.6, 242.7, 423/242.4, 239.1
See application file for complete search history.

(56) References Cited

U.S. PATENT DOCUMENTS

| | | |
|---|---|---|
| 2,106,734 A | 2/1935 | Gollmar |
| 2,043,109 A | 6/1936 | McKee et al. |
| 2,487,576 A | 11/1949 | Meyers |
| 2,608,461 A | 8/1952 | Frazier |
| 2,878,099 A | 3/1959 | Breuing et al. |
| 3,255,233 A | 6/1966 | Kunze et al. |
| 3,923,955 A | 12/1975 | Fattinger |
| 4,336,233 A | 6/1982 | Appl et al. |
| 4,515,760 A | 5/1985 | Lang et al. |
| 4,729,883 A | 3/1988 | Lam et al. |
| 4,847,057 A | 7/1989 | Brugerolle et al. |

(Continued)

FOREIGN PATENT DOCUMENTS
AU 648129 7/1992
(Continued)

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

(Continued)

*Primary Examiner* — Duane Smith
*Assistant Examiner* — Ives Wu
(74) *Attorney, Agent, or Firm* — Rita D. Vacca

(57) ABSTRACT

A method and system for $CO_2$ capture from flue gas uses an absorber vessel in which a flue gas stream containing $CO_2$ is contacted with an ammoniated solution to remove $CO_2$ from the flue gas, and a regenerator vessel in which $CO_2$ is released from the ammoniated solution. Parasitic energy consumption of the system can be reduced by adding to the ammoniated solution a promoter effective to enhance the formation of ammonium bicarbonate within the ammoniated solution. The amount of ammoniated solution recycled from the regenerator vessel to the absorber vessel is less than that which would be required using the ammoniated solution without the promoter for removal of the same amount of $CO_2$ from the flue gas.

14 Claims, 5 Drawing Sheets

U.S. PATENT DOCUMENTS

| | | |
|---|---|---|
| 4,977,745 A | 12/1990 | Heichberger |
| 4,999,031 A | 3/1991 | Gerhardt et al. |
| 5,067,972 A | 11/1991 | Hemmings et al. |
| 5,137,550 A | 8/1992 | Hegarty et al. |
| 5,186,916 A | 2/1993 | Nevels |
| 5,318,758 A | 6/1994 | Fujii |
| 5,378,442 A | 1/1995 | Fujii et al. |
| 5,427,759 A | 6/1995 | Heitmann |
| 5,453,115 A | 9/1995 | Vuletic |
| 5,462,583 A | 10/1995 | Wood et al. |
| 5,599,508 A | 2/1997 | Martinelli et al. |
| 5,648,053 A | 7/1997 | Mimura et al. |
| 5,700,311 A | 12/1997 | Spencer |
| 5,756,058 A | 5/1998 | Watanabe et al. |
| 5,832,712 A | 11/1998 | Rønning et al. |
| 5,853,680 A | 12/1998 | Iijima et al. |
| 5,979,180 A | 11/1999 | Lebas et al. |
| 6,027,552 A | 2/2000 | Ruck et al. |
| 6,143,556 A * | 11/2000 | Trachtenberg ............ 435/289.1 |
| 6,210,467 B1 | 4/2001 | Howard |
| 6,348,088 B2 | 2/2002 | Chung |
| 6,372,023 B1 | 4/2002 | Kiyono et al. |
| 6,458,188 B1 | 10/2002 | Mace |
| 6,485,547 B1 | 11/2002 | Iijima |
| 6,497,852 B2 | 12/2002 | Chakravarti et al. |
| 6,506,350 B2 | 1/2003 | Cooper et al. |
| 6,759,022 B2 | 7/2004 | Hammer et al. |
| 6,764,530 B2 | 7/2004 | Iijima |
| 7,004,997 B2 * | 2/2006 | Asprion et al. ................ 95/235 |
| 7,022,296 B1 | 4/2006 | Khang et al. |
| 7,083,662 B2 * | 8/2006 | Xu et al. ...................... 95/165 |
| 7,128,777 B2 | 10/2006 | Spencer |
| 7,160,456 B2 * | 1/2007 | Jarventie ..................... 210/603 |
| 7,255,842 B1 | 8/2007 | Yeh et al. |
| 7,596,952 B2 * | 10/2009 | Fradette et al. ................ 60/772 |
| 7,641,717 B2 * | 1/2010 | Gal ................................ 95/187 |
| 7,862,788 B2 * | 1/2011 | Gal et al. ...................... 423/228 |
| 2003/0045756 A1 | 3/2003 | Mimura et al. |
| 2003/0140786 A1 | 7/2003 | Iijima |
| 2004/0123736 A1 | 7/2004 | Torres, Jr. et al. |
| 2004/0126294 A1 | 7/2004 | Cooper et al. |
| 2005/0169825 A1 | 8/2005 | Cadours et al. |
| 2006/0178259 A1 | 8/2006 | Schubert et al. |
| 2006/0204425 A1 | 9/2006 | Kamijo et al. |
| 2007/0006565 A1 | 1/2007 | Fleischer et al. |
| 2008/0072762 A1 | 3/2008 | Gal |
| 2008/0178733 A1 | 7/2008 | Gal |
| 2008/0307968 A1 | 12/2008 | Kang et al. |
| 2009/0101012 A1 | 4/2009 | Gal et al. |
| 2009/0155889 A1 | 6/2009 | Handagama et al. |
| 2009/0282977 A1 | 11/2009 | Koss |
| 2010/0003177 A1* | 1/2010 | Aroonwilas et al. .......... 423/229 |
| 2010/0092368 A1* | 4/2010 | Neumann et al. .......... 423/437.1 |

FOREIGN PATENT DOCUMENTS

| | | |
|---|---|---|
| AU | 678622 | 6/1995 |
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| DE | 469840 | 12/1928 |
| DE | 2832493 | 7/1978 |
| DE | 3633690 | 4/1988 |
| DE | 10 2005 033837 | 1/2007 |
| EP | 0243778 | 11/1987 |
| EP | 0502596 | 9/1992 |
| EP | 0553643 | 8/1993 |
| EP | 0588178 | 3/1994 |
| EP | 1759756 | 3/2007 |
| GB | 271852 | 5/1926 |
| GB | 871207 | 6/1961 |
| GB | 899611 | 6/1962 |
| GB | 2331526 | 5/1999 |
| JP | 63171/77 | 5/1977 |
| JP | 62-87224/87 | 4/1987 |
| JP | 168638/96 | 7/1996 |
| JP | 10 202054 | 8/1998 |
| JP | 11 137960 | 5/1999 |
| JP | 2008-508099 | 3/2008 |
| JP | 2010-530802 | 9/2010 |
| KR | 100703999 B1 | 3/2007 |
| SU | 512785 | 5/1976 |
| SU | 1567251 | 5/1990 |
| WO | 98/47604 | 10/1998 |
| WO | 02/09849 | 2/2002 |
| WO | 02/089958 | 11/2002 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | 2008/072979 | 6/2008 |
| WO | 2008/094777 | 8/2008 |
| WO | 2008/101293 | 8/2008 |
| WO | 2008/144918 | 12/2008 |
| WO | 2009/000025 | 12/2008 |
| WO | 2010/053683 | 5/2010 |

OTHER PUBLICATIONS

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of $CO_2$, $SO_2$ and NOx," Int. J. Environmental Tech. and Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliminary Results" International Journal of Thermodynamics, International Centre for Applied Thermodynamics, Istanbul, TR, vol. 7, No. 4, Dec. 1, 2004, pp. 173-181.

"Semi-batch absorption and regeneration studies for $CO_2$ capture by aqueous ammonia", Fuel Processing Technology, vol. 86, No. 14-15, Oct. 1, 2005, pp. 1533-1546.

Japanese Office Action dated Oct. 14, 2011.

* cited by examiner

PROMOTER ENHANCED CHILLED AMMONIA BASED SYSTEM AND METHOD FOR REMOVAL OF $CO_2$ FROM FLUE GAS STREAM

CROSS REFERENCE TO RELATED APPLICATION(S)

This application is a Continuation of U.S. patent application Ser. No. 12/272,953, filed Nov. 18, 2008, which claims the benefit of U.S. provisional application entitled, "Enhanced $CO_2$ Absorption in a Chilled Ammonia Based Post-Combustion Flue Gas Processing System", having U.S. Ser. No. 60/992,340 filed on Dec. 5, 2007, both of which are incorporated by reference herein in their entireties.

FIELD OF THE INVENTION

The proposed invention relates to a system and method for removing carbon dioxide ($CO_2$) from a process gas stream containing carbon dioxide.

SUMMARY

Embodiments of the present invention provide a system and method for capturing carbon dioxide ($CO_2$) from a process gas stream. Briefly described, in architecture, one embodiment of the system, among others, can be implemented so as to include absorber vessel configured to receive a flue gas stream; absorber vessel further configured to receive a supply of an absorbent solution. The absorber vessel includes a gas to liquid mass transfer device (MTD) configured to place the flue gas stream into contact with the absorbent solution.

Embodiments of the present invention can also be viewed as providing a method for removing $CO_2$ from a flue gas stream. In this regard, one embodiment of such a method, among others, can be broadly summarized by the following steps: combining a promoter with an absorbent ionic solution (ionic solution); contacting the combined promoter and ionic solution with a flue gas stream that contains $CO_2$; and regenerating the combined promoter and ionic solution to release the $CO_2$ absorbed from the flue gas.

Other systems, methods, features, and advantages of the present invention will be or become apparent to those with ordinary skill in the art upon examination of the following drawings and detailed description. It is intended that all such additional systems, methods, features, and advantages be included within this description, be within the scope of the present invention, and be protected by the accompanying claims.

BACKGROUND

In the combustion of a fuel, such as coal, oil, peat, waste, etc., in a combustion plant, such as those associated with boiler systems for providing steam to a power plant, a hot process gas (or flue gas) is generated. Such a flue gas will often contain, among other things, carbon dioxide ($CO_2$) The negative environmental effects of releasing carbon dioxide to the atmosphere have been widely recognised, and have resulted in the development of processes adapted for removing carbon dioxide from the hot process gas generated in the combustion of the above mentioned fuels. One such system and process has previously been disclosed and is directed to a single-stage Chilled Ammonia based system and method for removal of carbon dioxide ($CO_2$) from a post-combustion flue gas stream.

Known Chilled Ammonia based systems and processes (CAP) provide a relatively low cost means for capturing/removing $CO_2$ from a gas stream, such as, for example, a post combustion flue gas stream. An example of such a system and process has previously been disclosed in pending patent application PCT/US2005/012794 (International Publication Number: WO 2006/022885/Inventor: Eli Gal)), filed on 12 Apr. 2005 and titled Ultra Cleaning of Combustion Gas Including the Removal of $CO_2$. In this process the absorption of $CO^2$ from a flue gas stream is achieved by contacting a chilled ammonia ionic solution (or slurry) with a flue gas stream that contains $CO_2$.

FIG. 1A is a diagram generally depicting a flue gas processing system 15 for use in removing various pollutants from a flue gas stream FG emitted by the combustion chamber of a boiler system 26 used in a steam generator system of, for example, a power generation plant. This system includes a CO2 removal system 70 that is configured to remove $CO_2$ from the flue gas stream FG before emitting the cleaned flue gas stream to an exhaust stack 90 (or alternatively additional processing). It is also configured to output $CO_2$ removed from the flue gas stream FG. Details of $CO_2$ removal system 70 are generally depicted in FIG. 1B.

With reference to FIG. 1B, CO2 removal System 70 includes a capture system 72 for capturing/removing $CO_2$ from a flue gas stream FG and a regeneration system 74 for regenerating ionic solution used to remove $CO_2$ from the flue gas stream FG. Details of capture system 72 are generally depicted in FIG. 1C.

With reference to FIG. 1C a capture system 72 of a $CO_2$ capture system 70 (FIG. 1A) is generally depicted. In this system, the capture system 72 is a chilled ammonia based $CO_2$ capture system. In a chilled ammonia based system/method for $CO_2$ removal, an absorber vessel is provided in which an absorbent ionic solution (ionic solution) is contacted with a flue gas stream (FG) containing $CO_2$. The ionic solution is typically aqueous and may be composed of, for example, water and ammonium ions, bicarbonate ions, carbonate ions, and/or carbamate ions. An example of a known CAP $CO_2$ removal system is generally depicted in the diagram of FIG. 10.

With reference to FIG. 1C, an absorber vessel 170 is configured to receive a flue gas stream (FG) originating from, for example, the combustion chamber of a fossil fuel fired boiler 26 (see FIG. 1A). It is also configured to receive a lean ionic solution supply from regeneration system 74 (see FIG. 1B). The lean ionic solution is introduced into the vessel 170 via a liquid distribution system 122 while the flue gas stream FG is also received by the absorber vessel 170 via flue gas inlet 76.

The ionic solution is put into contact with the flue gas stream via a gas-liquid contacting device (hereinafter, mass transfer device, MTD) 111 used for mass transfer and located in the absorber vessel 170 and within the path that the flue gas stream travels from its entrance via inlet 76 to the vessel exit 77. The gas-liquid contacting device 111 may be, for example, one or more commonly known structured or random packing materials, or a combination thereof.

Ionic solution sprayed from the spray head system 121 and/or 122 falls downward and onto/into the mass transfer device 111. The lean ionic solution feeding to the spray head system 122 and the recycled ionic solution feeding to spray head 121 can be combined and sprayed from one spray header. The ionic solution cascades through the mass transfer device 111 and comes in contact with the flue gas stream FG that is rising upward (opposite the direction of the ionic solution) and through the mass transfer device 111.

Once contacted with the flue gas stream, the ionic solution acts to absorb CO2 from the flue gas stream, thus making the ionic solution "rich" with CO2 (rich solution). The rich ionic solution continues to flow downward through the mass transfer device and is then collected in the bottom 78 of the absorber vessel 170. The rich ionic solution is then regenerated via regenerator system 74 (see FIG. 1B) to release the $CO_2$ absorbed by the ionic solution from the flue gas stream. The $CO_2$ released from the ionic solution may then be output to storage or other predetermined uses/purposes. Once the $CO_2$ is released from the ionic solution, the ionic solution is said to be "lean". The lean ionic solution is then again ready to absorb $CO_2$ from a flue gas stream and may be directed back to the liquid distribution system 122 whereby it is again introduced into the absorber vessel 170.

After the ionic solution is sprayed into the absorber vessel 170 via spray head system 122, it cascades downward onto and through the mass transfer device 111 where it is contacted with the flue gas stream FG. Upon contact with the flue gas stream the ionic solution reacts with $CO_2$ that may be contained in the flue gas stream. This reaction is exothermic and as such results in the generation of heat in the absorber vessel 170. This heat can cause some of the ammonia contained in the ionic solution to change into a gas. The gaseous ammonia then, instead of migrating downward along with the liquid ionic solution, migrates upward through the absorber vessel 170, along with and as a part of the flue gas stream and, ultimately, escaping via the exit 77 of the absorber vessel 170. The loss of this ammonia from the system (ammonia slip) decreases the molar concentration of ammonia in the ionic solution. As the molar concentration of ammonia decreases, so does the R value ($NH_3$—to —$CO_2$ mole ratio).

When a flue gas stream is contacted with the ionic solution, the carbon dioxide contained in the flue gas stream reacts to form bicarbonate ion by reacting with water ($H_2O$) and with hydroxyl ion ($OH^-$). These "capture reactions" (Reaction 1 through Reaction 9, shown below) are generally described as follows:

  (Reaction 1)

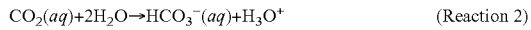  (Reaction 2)

  (Reaction 3)

The reactions of the $NH_3$ and its ions and $CO_2$ occur in the liquid phase and are discussed below. However, in low temperature, typically below 70-80 F and high ionic strength, typically 2-12M ammonia ions the bicarbonate produced in Reaction (2) and Reaction (3), reacts with ammonium ions and precipitates as ammonium bicarbonate when the ratio $NH_3/CO_2$ is smaller than 2.0 according to:

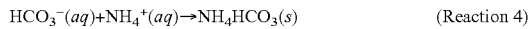  (Reaction 4)

Reaction 2 is a slow reaction while Reaction 3 is a faster reaction. At high pH levels such as, for example when pH is greater than 10, the concentration of $OH^-$ in the ionic solution is high and thus most of the CO2 is captured through reaction (3) and high $CO_2$ capture efficiency can be achieved. At lower pH the concentration of the hydroxyl ion $OH^-$ is low and the $CO_2$ capture efficiency is also low and is based mainly on reaction (2).

In the Chilled Ammonia Based $CO_2$ Capture system(s)/method(s) the CO2 in the flue gas stream is captured by contacting the flue gas stream with an aqueous ammonia solution allowing the $CO_2$ in the flue gas stream to directly react with the aqueous ammonia. At low R, typically less than about 2, and pH typically lower than 10, the direct reaction of $CO_2$ with ammonia contained in the ionic solution is the dominant mechanism for $CO_2$ capture. The first step in the $CO_2$ sequence capture is the $CO_2$ mass transfer from the gas phase to the liquid phase of reaction (1). In the liquid phase a sequence of reaction occur between the aqueous $CO_2$ and aqueous ammonia:

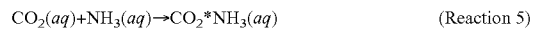  (Reaction 5)

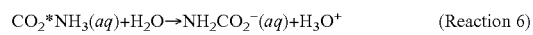  (Reaction 6)

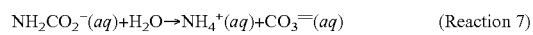  (Reaction 7)

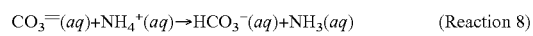  (Reaction 8)

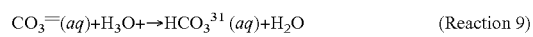  (Reaction 9)

As described above the bicarbonate produced in Reaction (8) & Reaction (9) can react with ammonium ions to precipitate as solid ammonium bicarbonate based on Reaction (4), while the ammonia produced in Reaction (8) can react with additional $CO_2$ based on Reaction (5).

The sequence of the chain of reactions (5) through (9) is relatively slow and thus requires a large and expensive $CO_2$ capture device. The slow rate of CO2 absorption is due to: 1) one or more slow reactions in the sequence of capture reactions (Reaction 1 thru Reaction 9); and 2) the accumulation of intermediate species, such as $CO_2*NH_3$ and $NH_2CO_2^-$, in the ionic solution. The accumulation of intermediate species slows the $CO_2$ capture process and results in lower $CO_2$ capture efficiency with a power generation facility. Thus, a heretofore unaddressed need exists in the industry to accelerate the rate of the $CO_2$ capture reactions that allows significant reduction in the size and thus the cost of the $CO_2$ capture device and its auxiliary systems.

Further, features of the present invention will be apparent from the description and the claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. The invention will now be described in more detail with reference to the appended drawings in which.

DISCUSSION

Figure 1A:
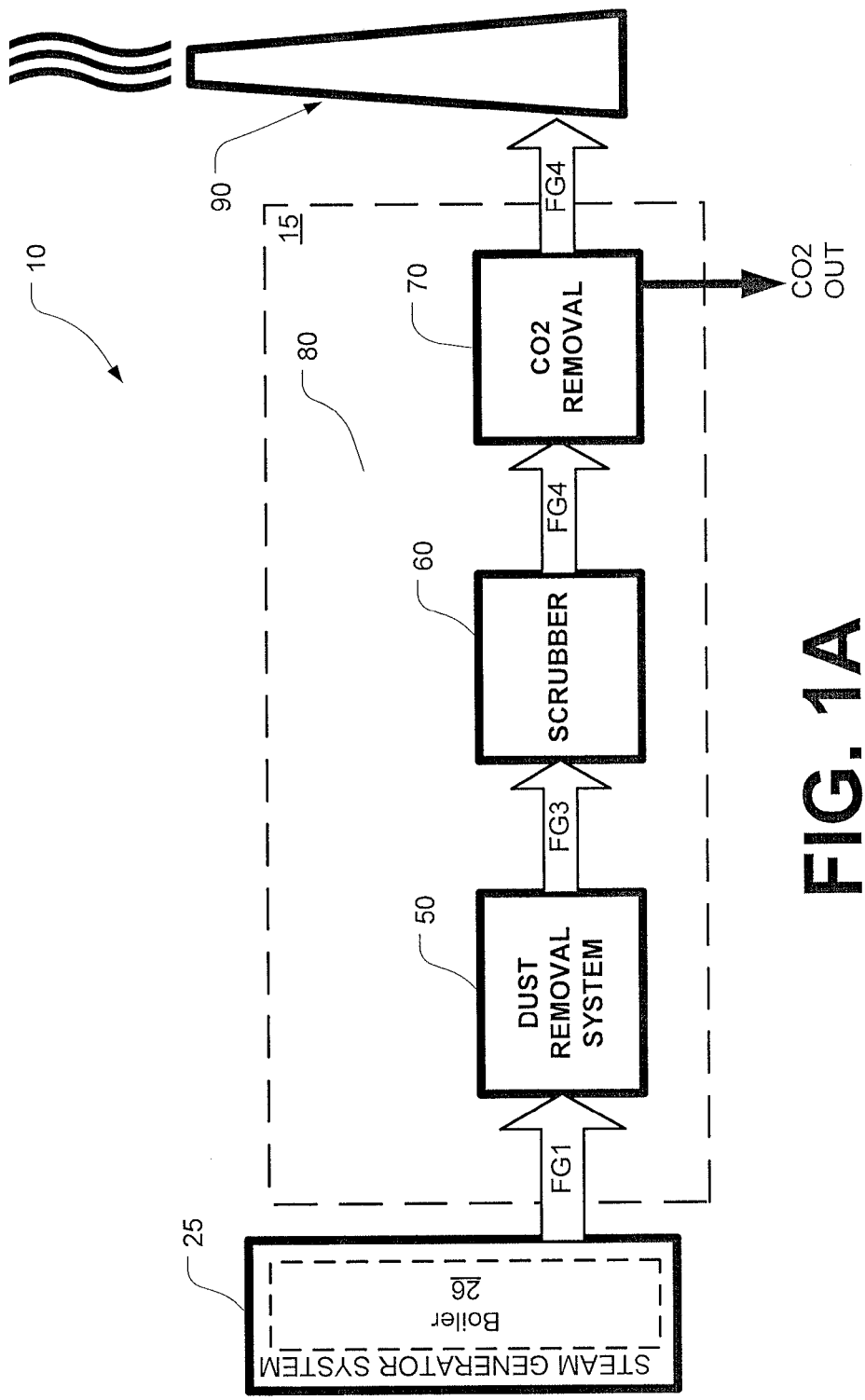
FIG. 1A is a diagram generally depicting a flue gas processing system 15 that includes a $CO_2$ removal system 70.

The proposed invention is directed to a chilled ammonia based $CO_2$ capture system and method. More particularly, the proposed invention is directed to chilled ammonia based $CO_2$ capture system and method in which a promoter is used to help accelerate certain capture reactions that occur substantially coincident to and/or as a result of contacting a chilled ammonia based ionic solution with a gas stream that contains $CO_2$.

A system and method for removing $CO_2$ from a gas stream is proposed in which a chilled ammonia based ionic solution is provided that includes a promoter to help accelerate certain chemical reactions that occur between $CO_2$ and ammoniated ionic solution, substantially coincident to and/or as a result of the contacting of the chilled ammonia based ionic solution with a gas stream that contains $CO_2$. In a preferred embodiment, an ionic solution is mixed with a promoter. This ionic solution-promoter mix is then contacted with a flue gas stream via, for example, a $CO_2$ capture absorber/absorber vessel.

The promoter acts to accelerate certain "capture reactions", namely the following reactions (Reaction 5 through Reaction 9) that take place:

$$CO_2(aq)+NH_3(aq)\rightarrow CO_2{*}NH_3(aq) \quad \text{(Reaction 5)}$$

$$CO_2{*}NH_3(aq)+H_2O\rightarrow NH_2CO_2^-(aq)+H_3O^+ \quad \text{(Reaction 6)}$$

$$NH_2CO_2^-(aq)+H_2O\rightarrow NH_4^+(aq)+CO_3^=(aq) \quad \text{(Reaction 7)}$$

$$CO_3^=(aq)+NH_4^+(aq)\rightarrow HCO_3^-(aq)+NH_3(aq) \quad \text{(Reaction 8)}$$

$$CO_3^=(aq)+H_3O+\rightarrow HCO_3^-(aq)+H_2O \quad \text{(Reaction 9)}$$

By accelerating the capture reactions (5) through (9), the proposed system is able to capture more $CO_2$ from a flue gas stream per unit of time, thereby allowing for more $CO_2$ to be removed from a flue gas stream.

In one embodiment of the proposed invention, the promoter that is used is an amine. This amine is mixed with the ionic solution and subsequently contacted with a flue gas stream containing $CO_2$. An example of a possible amine that may be used as a promoter includes, but is not limited to piperazine (PZ). In a further embodiment, the promoter that is used is an enzyme or enzyme system. In this embodiment the enzyme or enzyme system is mixed with the ionic solution and subsequently contacted with a flue gas stream containing $CO_2$. An example of an enzyme or enzyme system that may be used as a promoter includes, but is not limited to the Carbozyme permeator available from Carbozyme, Inc of 1 Deer Park Drive, Suite H-3, Monmouth Junction, N.J. 08852.

Piperazine is a $C_4N_2H_{10}$ cyclical compound and has been used as a promoter for $CO_2$ capture in amine systems. Testing has indicated that piperazine is a very good promoter for use with ammoniated solutions to enhance $CO_2$ capture and the production of ammonium bicarbonate. Adding 0.2-2.0 molar PZ, and preferably 0.4-1.0 molar PZ, to the ionic solution provides a significant increase in $CO_2$ capture efficiency. It also provides an increase in precipitation of ammonium bicarbonate solid particles from the solution. Since the ammonium bicarbonate is richer in $CO_2$ than the solution itself, (the $NH_3/CO_2$ ratio of the solid particles is 1.0) the precipitation of the ammonium bicarbonate particles from the solution increases the $NH_3/CO_2$ ratio and the pH of the solution resulting in leaner solution that can capture more $CO_2$.

The action of a PZ promoter in accelerating certain capture reactions may allow for a significant reduction, by as much as 50-80%, in the physical size of the $CO_2$ absorber vessel and associated equipment. It also allows for reduction in parasitic power consumption due to resulting reductions in pressure drop and liquid recycle rate in the absorber. In short, it allows for implementation and operation of a useful $CO_2$ capture system at a much lower cost.

Figure 2:
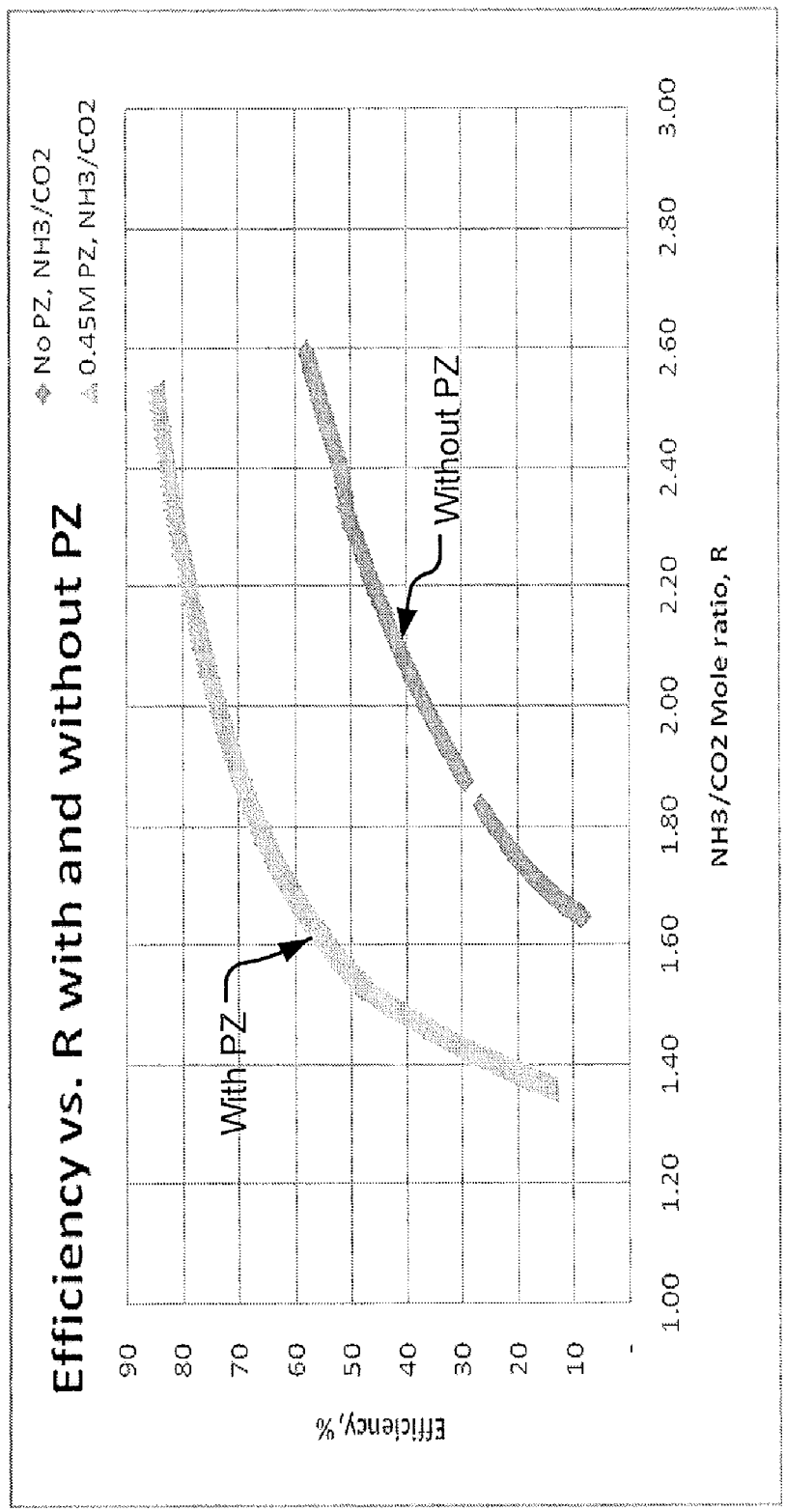
FIG. 2 is a graph that generally illustrates the capture efficiency of a system in which an ionic solution is used to capture $CO_2$ both with and without a promoter.

FIG. 2 is a graphical representation of the relative $CO_2$ capture efficiency when ionic solution with and without promoter, such as PZ, is used. FIG. 2 shows that there is an increase in $CO_2$ capture efficiency when an ionic solution containing 0.45M PZ is contacted with a flue gas stream via an 11 ft packed absorber vessel as compared to not using PZ.

In FIG. 2, at $NH_3/CO_2$ mole ratio R=2.4 the $CO_2$ capture efficiency is 82% with 0.45M PZ and only 51% with no PZ. At R=2.0 efficiency drops to 74% with 0.45M PZ and to only 36% with no PZ. At R=1.8 efficiency is 66% with 0.45M PZ and only 23% with no PZ. At R=1.6 efficiency is still high with 0.45M PZ at 52% while efficiency with no PZ is less than 10% under the operating conditions of the test.

The PZ promoter is stable in both absorption and regeneration conditions and regenerated solution containing PZ performs as well as fresh PZ in multiple $CO_2$ absorption cycles. By using an absorbent ionic solution that includes a chilled ammonia and a promoter, such as, for example piperazine, the $CO_2$ capture efficiency of a chilled ammonia based $CO_2$ capture system may be enhanced dramatically. Piperazine is stable under both low temperature absorption conditions and high pressure and temperature regeneration conditions. Regenerated $CO_2$ lean solution containing piperazine appears to perform as well piperazine that is freshly injected into ammoniated solutions.

Figure 1B:
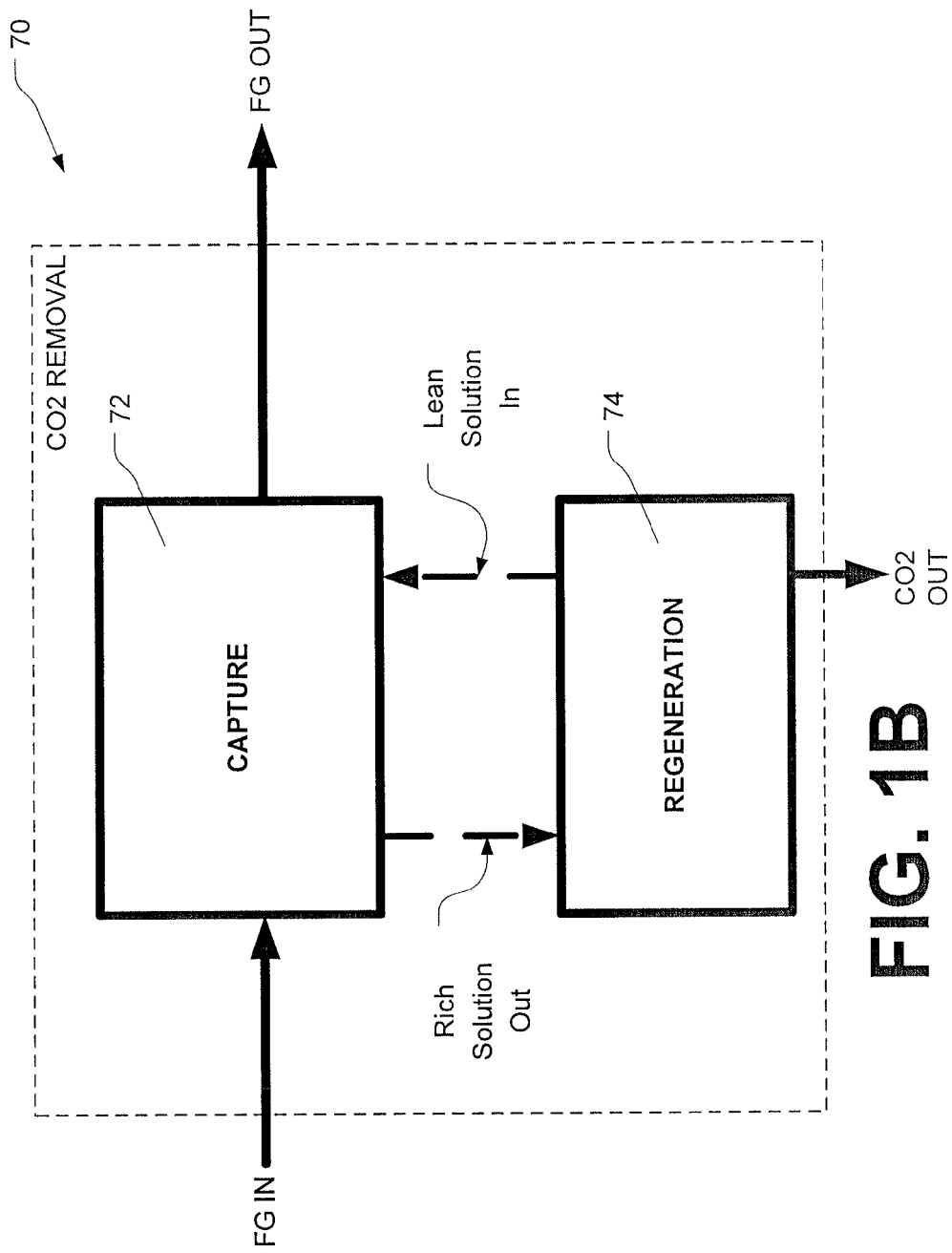
FIG. 1B is a diagram generally depicting further details of a $CO_2$ removal system 70 that includes a capture system 72 and a regeneration system 74.
Figure 1C:
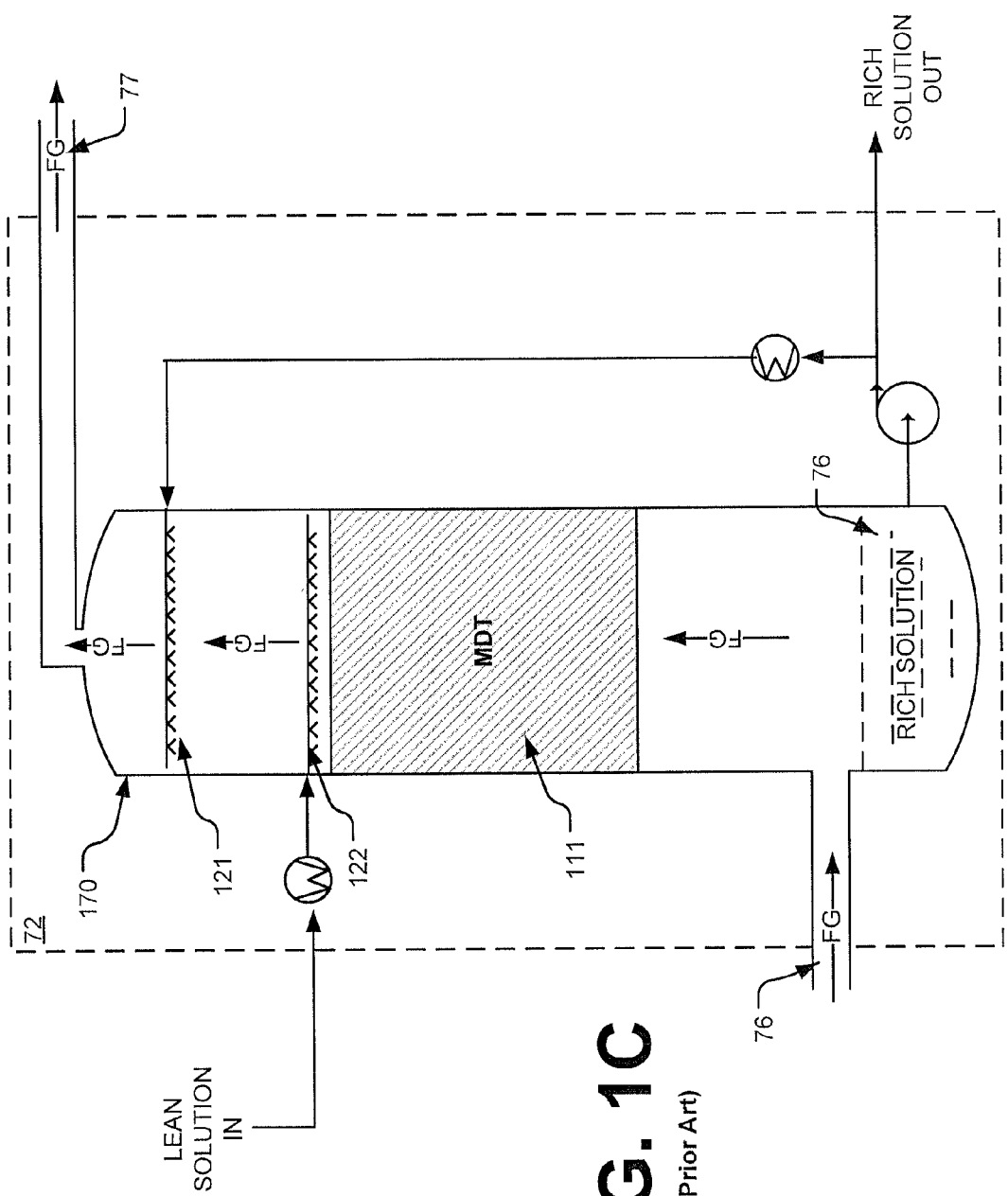
FIG. 1C is a diagram generally depicting details of a capture system 72.
Figure 3:
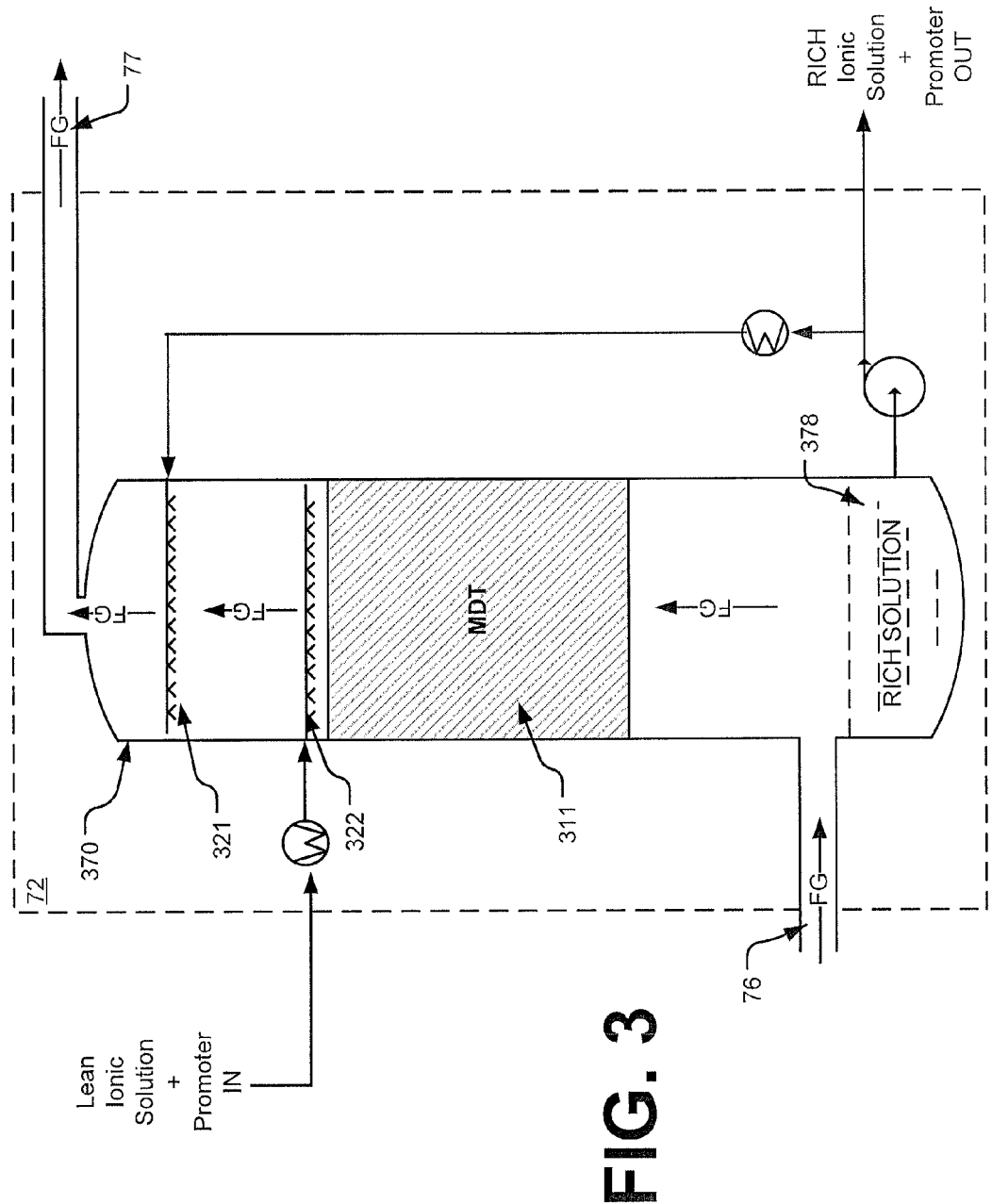
FIG. 3 is a diagram generally depicting an embodiment of a capture system 72 that includes an absorber system for contacting an ionic solution+promoter with a flue gas stream.

FIG. 3 is a diagram generally depicitng an embodiment of a system configured to capture $CO_2$ from a flue gas stream in accordance with the invetion. With reference to FIG. 3, an absorber vessel 370 is configured to receive a flue gas stream (FG) originating from, for example, the combustion chamber of a fossil fuel fired boiler 26 (see FIG. 1A). It is also configured to receive a lean ionic solution+promoter supply from regeneration system 74 (see FIG. 1B). The lean ionic solution+promoter supply is introduced into the vessel 370 via a liquid distribution system 322 while the flue gas stream FG is also received by the absorber vessel 370 via flue gas inlet 76.

The ionic solution+promoter is put into contact with the flue gas stream via a gas-liquid contacting device (hereinafter, mass transfer device, MTD) 311 used for mass transfer and located in the absorber vessel 370 and within the path that the flue gas stream travels from its entrance via inlet 76 to the vessel exit 77. The gas-liquid contacting device 311 may be, for example, one or more commonly known structured or random packing materials, or a combination thereof.

Ionic solution+promoter sprayed from the spray head system 321 and/or 322 falls downward and onto/into the mass transfer device 311. The ionic solution cascades through the mass transfer device 311 and comes in contact with the flue gas stream FG that is rising upward (opposite the direction of the ionic solution+promoter) and through the mass transfer device 311.

Once contacted with the flue gas stream, the ionic solution+promoter acts to absorb $CO_2$ from the flue gas stream, thus making the ionic solution+promoter "rich" with $CO_2$ (rich ionic+promoter solution). The rich ionic solution+promoter continues to flow downward through the mass transfer device and is then collected in the bottom 378 of the absorber vessel 370.

The rich ionic solution+promoter is then regenerated via regenerator system 74 (see FIG. 1B) to release the $CO_2$ absorbed by the ionic solution from the flue gas stream. The $CO_2$ released from the ionic solution+promoter may then be output to storage or other predetermined uses/purposes. Once the $CO_2$ is released from the ionic solution+promoter, the ionic solution+promoter is said to be "lean". The lean ionic solution+promoter is then again ready to absorb $CO_2$ from a flue gas stream and may be directed back to the liquid distribution system 122 whereby it is again introduced into the absorber vessel 370.

After the ionic solution is sprayed into the absorber vessel 370 via spray head system 322, it cascades downward onto and through the mass transfer device 311 where it is contacted with the flue gas stream FG. Upon contact with the flue gas stream the ionic solution+promoter reacts with the $CO_2$ to thereby capture and remove it from the flue gas stream.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of reducing power consumed by a system for capturing $CO_2$ from flue gas, the method comprising:
   contacting in a contacting step a flue gas stream containing $CO_2$ with an ammoniated solution lean in $CO_2$ to provide an ammoniated solution rich in $CO_2$;
   regenerating in a regenerating step the ammoniated solution rich in $CO_2$ to release $CO_2$ from the ammoniated solution, thereby producing the ammoniated solution lean in $CO_2$;
   recycling the ammoniated solution lean in $CO_2$ from the regenerating step to the contacting step;
   adding a promoter to the ammoniated solution lean in $CO_2$, the promoter being effective to enhance the formation of ammonium bicarbonate within the ammoniated solution lean in $CO_2$, thereby increasing the $CO_2$ absorption capacity of the ammoniated solution lean in $CO_2$; and
   reducing the amount of ammoniated solution lean in $CO_2$ that is recycled from the regenerating step to the contacting step, thereby reducing the power consumed by the system.

2. The method of claim 1 wherein the promoter comprises an amine.

3. The method of claim 2 wherein the amine comprises piperazine.

4. The method of claim 3, wherein the promoter includes 0.2-2.0 molar piperazine.

5. The method of claim 4, wherein the promoter includes 0.4-1.0 molar piperazine.

6. The method of claim 1 wherein the promoter includes an enzyme.

7. A method of capturing $CO_2$ from flue gas using system comprising an absorber vessel in which a flue gas stream containing $CO_2$ is contacted with an ammoniated solution to remove $CO_2$ from the flue gas, and a regenerator vessel in which $CO_2$ is released from the ammoniated solution, the method comprising:
   adding to the ammoniated solution a promoter effective to enhance the formation of ammonium bicarbonate within the ammoniated solution; and
   recycling an amount of the ammoniated solution from the regenerator vessel to the absorber vessel to remove an amount of $CO_2$ from the flue gas, the amount of the ammoniated solution being less than that which would be required to remove the amount of $CO_2$ from the flue gas using the ammoniated solution without the promoter.

8. The method of claim 7 wherein the promoter comprises an amine.

9. The method of claim 8 wherein the amine comprises piperazine.

10. The method of claim 9, wherein the promoter includes 0.2-2.0 molar piperazine.

11. The method of claim 10, wherein the promoter includes 0.4-1.0 molar piperazine.

12. The method of claim 7 wherein the promoter includes an enzyme.

13. The method of claim 7, wherein the absorber vessel is reduced from the physical size required for removal of the amount of CO2 from the flue gas using the ammoniated solution without the promoter.

14. The method of claim 13, wherein the absorber vessel is reduced 50-80% from the physical size required for removal of the amount of $CO_2$ from the flue gas using the ammoniated solution without the promoter.

* * * * *